United States Patent
Seo

(10) Patent No.: US 10,383,089 B2
(45) Date of Patent: Aug. 13, 2019

(54) METHOD FOR TRANSMITTING DEVICE TO DEVICE COMMUNICATION SIGNAL THROUGH UNLICENSED BAND IN WIRELESS COMMUNICATION SYSTEM AND APPARATUS THEREFOR

(71) Applicant: LG ELECTRONICS INC., Seoul (KR)

(72) Inventor: Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/554,462

(22) PCT Filed: Mar. 31, 2016

(86) PCT No.: PCT/KR2016/003314
§ 371 (c)(1),
(2) Date: Aug. 30, 2017

(87) PCT Pub. No.: WO2016/159677
PCT Pub. Date: Oct. 6, 2016

(65) Prior Publication Data
US 2018/0077684 A1    Mar. 15, 2018

Related U.S. Application Data

(60) Provisional application No. 62/142,489, filed on Apr. 3, 2015.

(51) Int. Cl.
*H04W 4/00* (2018.01)
*H04W 72/02* (2009.01)
(Continued)

(52) U.S. Cl.
CPC .......... *H04W 72/02* (2013.01); *H04W 16/14* (2013.01); *H04W 72/04* (2013.01); *H04W 88/02* (2013.01); *H04W 76/14* (2018.02)

(58) Field of Classification Search
None
See application file for complete search history.

(56) References Cited

U.S. PATENT DOCUMENTS

2013/0188575 A1* 7/2013 Lee ................ H04W 24/00
370/329
2014/0094183 A1 4/2014 Gao et al.
(Continued)

FOREIGN PATENT DOCUMENTS

WO  2015021185 A1  2/2015

OTHER PUBLICATIONS

R1-151003: 3GPP TSG RAN WG1 Ad-hoc Meeting, Paris, France, Mar. 24-26, 2015, CATT, "Design of frame-based LBT for LAA," Sections 2.3, 2.4.
(Continued)

*Primary Examiner* — Farah Faroul
(74) *Attorney, Agent, or Firm* — Dentons US LLP

(57) ABSTRACT

Disclosed is a method for transmitting a device to device (D2D) signal by a terminal in a wireless communication system. More particularly, the method for transmitting a D2D signal comprises the steps of: configuring a resource pool comprising a plurality of resource units for transmitting the D2D signal; determining the number of transmission attempts for the D2D signal; selecting as many resource units as the number of transmission attempts from among the resource units in the resource pool; and determining whether the selected resource units are in the busy state or in the idle state over time, and when it is determined that the selected resource units are in the idle state, transmitting the D2D signal to a target terminal.

12 Claims, 8 Drawing Sheets

(51) Int. Cl.
*H04W 72/04* (2009.01)
*H04W 88/02* (2009.01)
*H04W 16/14* (2009.01)
*H04W 76/14* (2018.01)

(56) References Cited

U.S. PATENT DOCUMENTS

| | | | | |
|---|---|---|---|---|
| 2014/0112194 | A1* | 4/2014 | Novlan | H04W 8/005 |
| | | | | 370/254 |
| 2014/0254429 | A1* | 9/2014 | Wang | H04L 5/0037 |
| | | | | 370/254 |
| 2014/0307642 | A1 | 10/2014 | Wanstedt et al. | |
| 2014/0328329 | A1 | 11/2014 | Novlan et al. | |
| 2015/0016312 | A1 | 1/2015 | Li et al. | |
| 2015/0043483 | A1 | 2/2015 | Sartori et al. | |
| 2015/0215903 | A1* | 7/2015 | Zhao | H04W 72/04 |
| | | | | 370/329 |
| 2015/0289241 | A1* | 10/2015 | Gresset | H04L 5/0044 |
| | | | | 370/330 |
| 2015/0296443 | A1* | 10/2015 | Lim | H04W 48/12 |
| | | | | 370/312 |
| 2016/0014589 | A1* | 1/2016 | Niu | H04W 74/02 |
| | | | | 370/329 |
| 2016/0150507 | A1* | 5/2016 | Kim | H04W 72/04 |
| | | | | 455/450 |
| 2016/0183276 | A1 | 6/2016 | Marinier et al. | |
| 2016/0212793 | A1* | 7/2016 | Jung | H04W 76/14 |
| 2016/0323869 | A1* | 11/2016 | Xu | H04W 72/0473 |
| 2016/0337839 | A1* | 11/2016 | Chae | H04W 76/14 |
| 2017/0142741 | A1* | 5/2017 | Kaur | H04W 56/002 |
| 2017/0223711 | A1* | 8/2017 | Wang | H04W 76/14 |

OTHER PUBLICATIONS

R1-150150:3GPP TSG RAN WG1 Meeting #80, Athens, Greece, Feb. 9-13, 2015, ZTE, "Discussion on the evaluation methodology for UL transmission in unlicensed spectrum," See p. 2.

LG Electronics, "Discussion on Resource Allocation in D2D Communications," 3GPP TSG RAN WG1 Meeting #75, Nov. 11-15, 2013, R1-135481.

\* cited by examiner

FIG. 2
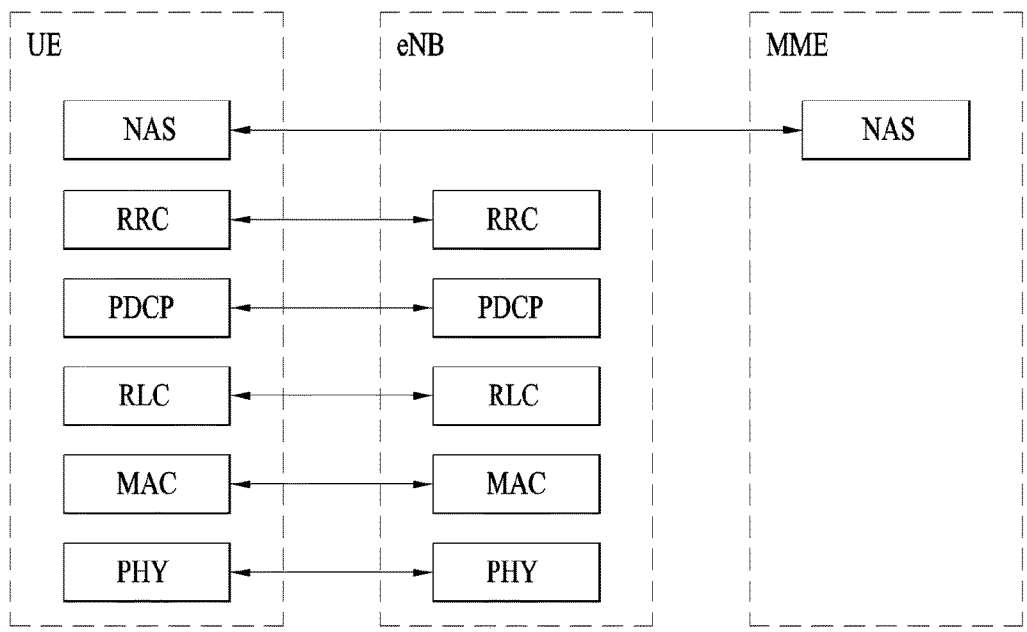
(A) CONTROL-PLANE PROTOCOL STACK
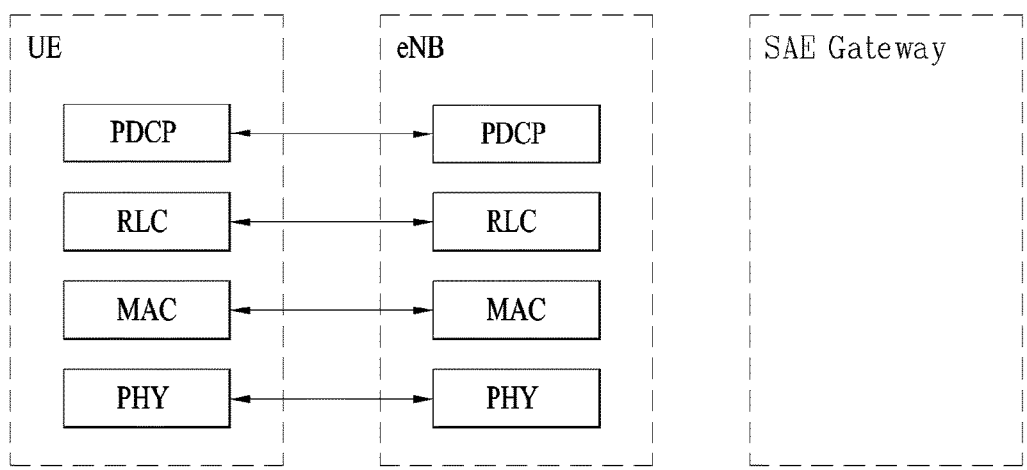
(B) USER-PLANE PROTOCOL STACK D2D signal transmission
from UE to which resource unit #0
is allocated

METHOD FOR TRANSMITTING DEVICE TO DEVICE COMMUNICATION SIGNAL THROUGH UNLICENSED BAND IN WIRELESS COMMUNICATION SYSTEM AND APPARATUS THEREFOR

This application is a 35 USC § 371 National Stage entry of International Application No. PCT/KR2016/003314 filed on Mar. 31, 2016, and claims priority to U.S. Provisional Application No. 62/142,489 filed on Apr. 3, 2015, all of which are hereby incorporated by reference in their entireties as if fully set forth herein.

TECHNICAL FIELD

The present invention relates to a wireless communication system, and more particularly, to a method of transmitting a device to device direct communication signal through an unlicensed band in a wireless communication system and an apparatus therefor.

BACKGROUND ART

A structure of a 3GPP LTE (3rd Generation Partnership Project Long Term Evolution; hereinafter, referred as "LTE") system which is an example of a wireless communication system to which the present invention may be applied will be described.

FIG. 1 illustrates a schematic structure a network structure of an evolved universal mobile telecommunication system (E-UMTS). An E-UMTS system is an evolved version of the UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist for one BS. The cell provides a downlink or uplink transmission service to several UEs using any one of bandwidths of 1.25, 2.5, 5, 10, 15 and 20 MHz. Different cells may be set to provide different bandwidths. A BS controls data transmission or reception to or from a plurality of UEs. The BS transmits downlink scheduling information to a UE with respect to downlink (DL) data so as to inform the UE of time/frequency domain, coding, data size, Hybrid Automatic Repeat and reQuest (HARQ) associated information of data to be transmitted, or the like. The BS transmits uplink scheduling information to a UE with respect to uplink (UL) data so as to inform the UE of time/frequency domain, coding, data size, HARQ associated information used by the UE, or the like. An interface for transmitting user traffic or control traffic can be used between BSs. A Core Network (CN) may include the AG, a network node for user registration of the UE, or the like. The AG manages mobility of a UE on a Tracking Area (TA) basis. One TA includes a plurality of cells.

Wireless communication technology has been developed to reach the LTE based on Wideband Code Division Multiple Access (WCDMA), but demands and expectations of users and providers have continuously increased. In addition, since other aspects of wireless access technology continue to evolve, new advances are required to remain competitive in the future. There is a need for reduction in cost per bit, service availability increase, the use of a flexible frequency band, a simple structure and an open type interface, appropriate power consumption of a UE, etc.

DISCLOSURE OF THE INVENTION

Technical Task

Based on the aforementioned discussion, a method of transmitting a device to device direct communication signal through an unlicensed band in a wireless communication system and an apparatus therefor are proposed in the following.

Technical Solution

To achieve these and other advantages and in accordance with the purpose of the present invention, as embodied and broadly described, according to one embodiment, a method of transmitting a D2D (device to device) signal by a user equipment (UE) in a wireless communication system, includes the steps of configuring a resource pool including a plurality of resource units for transmitting the D2D signal, determining the number of transmission attempts of the D2D signal, selecting resource units as many as the number of transmission attempts from among a plurality of the resource units, and determining whether the selected resource units are in a busy state or an idle state over time, and if it is determined that the selected resource units are in the idle state, transmitting the D2D signal to a target UE.

In this case, selecting the resource units includes selecting resource units as many as the number of transmission attempts from among resource units existing after the timing at which the number of transmission attempts is determined.

Preferably, if it is determined that a first resource unit among the selected resource units is in the busy state, transmitting the D2D signal to the target UE includes determining whether or not a second resource unit among the selected resource units is in the busy state or the idle state. More preferably, if it is determined that the second resource unit is in the idle state, transmitting the D2D signal to the target UE includes transmitting the D2D signal to the target UE in the second resource unit.

To further achieve these and other advantages and in accordance with the purpose of the present invention, according to a different embodiment, a user equipment (UE) performing D2D (device to device) communication in a wireless communication system includes a wireless communication module configured to transceive a signal with a target UE or a network and a processor configured to process the signal, the processor configured to determine the number of transmission attempts of a D2D signal, the processor configured to select resource units as many as the number of transmission attempts from among a plurality of resource units belonging to a resource pool configured to transmit the D2D signal, the processor configured to determine whether the selected resource units are in a busy state or an idle state over time, and if it is determined that the selected resource units are in the idle state, configured to control the wireless communication module to transmit the D2D signal to the target UE.

In this case, the processor is configured to select resource units, which exist after the timing at which the number of transmission attempts is determined, from the resource pool.

Preferably, if it is determined that a first resource unit among the selected resource units is in the busy state, the processor is configured to determine whether or not a second resource unit among the selected resource units is in the busy state or the idle state. More preferably, if it is determined that the second resource unit is in the idle state, the processor is configured to control the wireless communication module to transmit the D2D signal to the target UE in the second resource unit.

In the aforementioned embodiments, the resource pool is defined in an unlicensed band. And, the selected resource units are defined by a different time resource.

Advantageous Effects

According to the embodiments of the present invention, a UE is able to efficiently transmit and receive a device to device direct communication signal through an unlicensed band.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram for structures of control and user planes of radio interface protocol between a 3GPP radio access network standard-based user equipment and E-UTRAN;

BEST MODE

Mode for Invention

Figure 1:
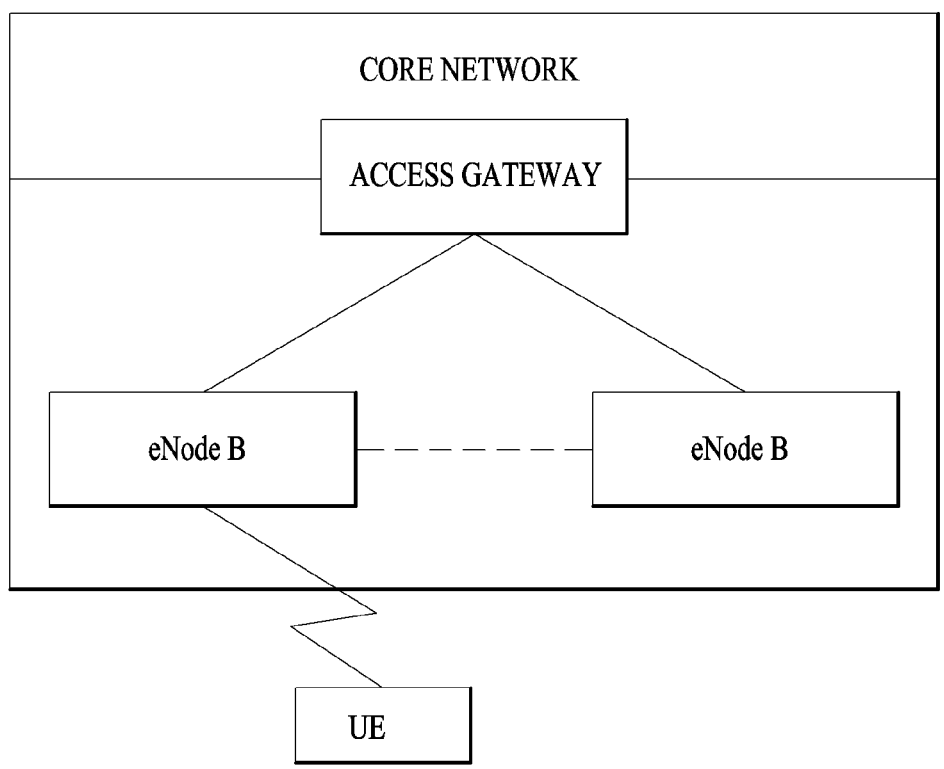
FIG. 1 is a schematic diagram of E-UMTS network structure as one example of a wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

And, in the present specification, a base station can be named by such a comprehensive terminology as an RRH (remote radio head), an eNB, a TP (transmission point), an RP (reception point), a relay and the like.

FIG. 2 is a diagram showing the structure of a control plane and a user plane of a radio interface protocol between a UE and an E-UTRAN based on the 3GPP radio access network standard. The control plane refers to a path through which control messages used for managing a call by the UE and the E-UTRAN are transmitted. The user plane refers to a path through which data generated at an application layer, for example, voice data, Internet packet data or the like is transmitted.

The physical layer, which is the first layer, provides an information transfer service to a higher layer using a physical channel. The physical layer is connected with a medium access control (MAC) layer located at a higher level through a transport channel, and data is transferred between the MAC layer and the physical layer via the transport channel. Data is transferred between physical layers of a transmission side and a reception side via the physical channel. The physical channel uses time and frequency as radio resources. In detail, the physical channel is modulated using an Orthogonal Frequency Division Multiple Access (OFDMA) scheme in downlink and is modulated using a Single Carrier Frequency Division Multiple Access (SC-FDMA) scheme in uplink.

The MAC layer of the second layer provides services to a radio link control (RLC) layer, which is a higher layer, via a logical channel. The RLC layer of the second layer enables reliable data transmission. The function of the RLC layer is included as the functional block of the MAC layer. A Packet Data Convergence Protocol (PDCP) layer of the second layer performs a header compression function that reduces the size of an Internet protocol (IP) packet header containing unnecessary control information having a relatively large size in order to efficiently transmit the IP packets such as IPv4 or IPv6 packets over a radio interface having a limited bandwidth.

Radio Resource Control (RRC) located at a lowest portion of the third layer is defined only in the control plane. The RRC layer handles logical channels, transport channels and physical channels for the configuration, re-configuration and release of Radio Bearers (RBs). Here, the RBs refer to services provided by the second layer, for data transfer between the UE and the network. The RRC layers of the UE and the network exchange RRC messages with each other. If the RRC layers of the UE and the network are RRC-connected, the UE is in an RRC connected mode and, if so not, is in an RRC idle mode. A Non-Access Stratum (NAS) layer located at a layer higher than the RRC layer performs a function such as session management and mobility management.

One cell configuring a base station (eNB) provides a downlink or uplink transmission service to several UEs using any one of bandwidths of 1.25, 2.5, 5, 10, 15 and 20 MHz. Different cells may be set to provide different bandwidths.

Examples of a downlink transport channel for transmitting data from the network to the UE include a Broadcast Channel (BCH) for transmitting system information, a Paging Channel (PCH) for transmitting a paging message, or a downlink Shared Channel (SCH) for transmitting user traffic or a control message. Traffic or a control message of a broadcast service or downlink multicast may be transmitted through the downlink SCH or a separate downlink Multicast Channel (MCH). Examples of an uplink transport channel for transmitting data from the UE to the network include a Random Access Channel (RACH) for transmitting an initial control message and an uplink SCH for transmitting user traffic or a control message. Examples of a logical channel located at a layer above the transport channel and mapped to the transport channel includes a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
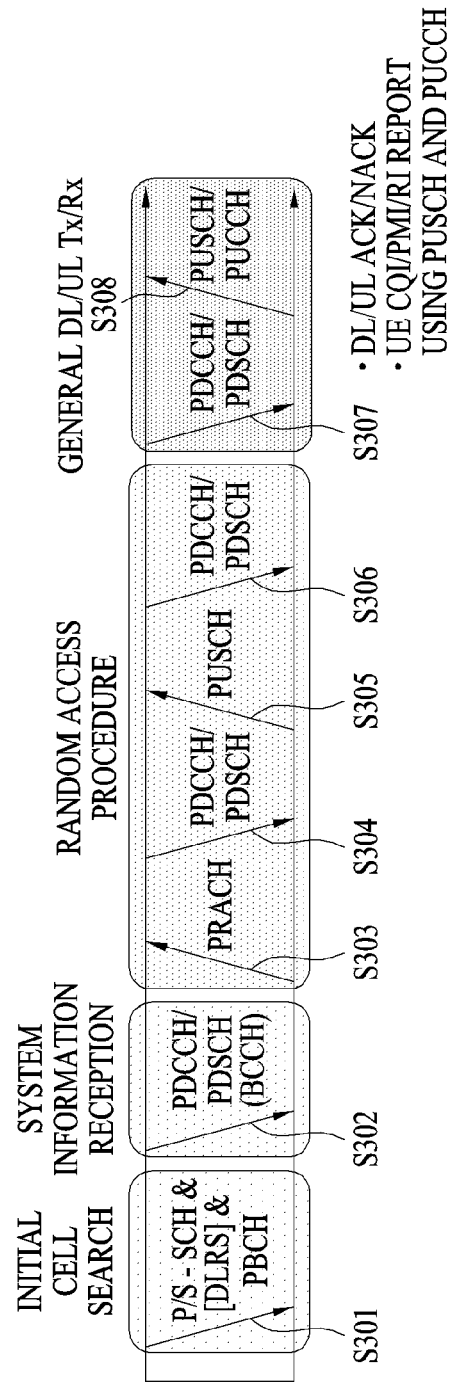
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
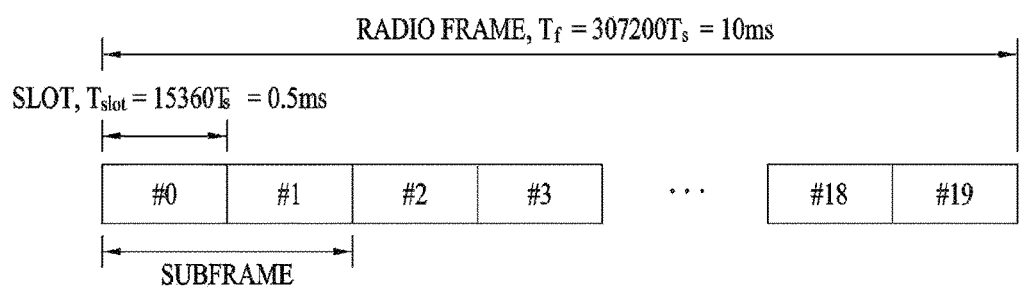
FIG. 4 is a diagram for a structure of a radio frame in LTE system.

FIG. 4 is a diagram for a structure of a radio frame in LTE system.

Referring to FIG. 4, one radio frame has a length of 10 ms ($327,200 \times T_S$) and is constructed with 10 subframes in equal size. Each of the subframes has a length of 1 ms and is constructed with two slots. Each of the slots has a length of 0.5 ms ($15,360 \times T_S$). In this case, $T_s$ indicates a sampling time and is represented as $T_s = 1/(15 \text{ kHz} \times 2048) = 3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
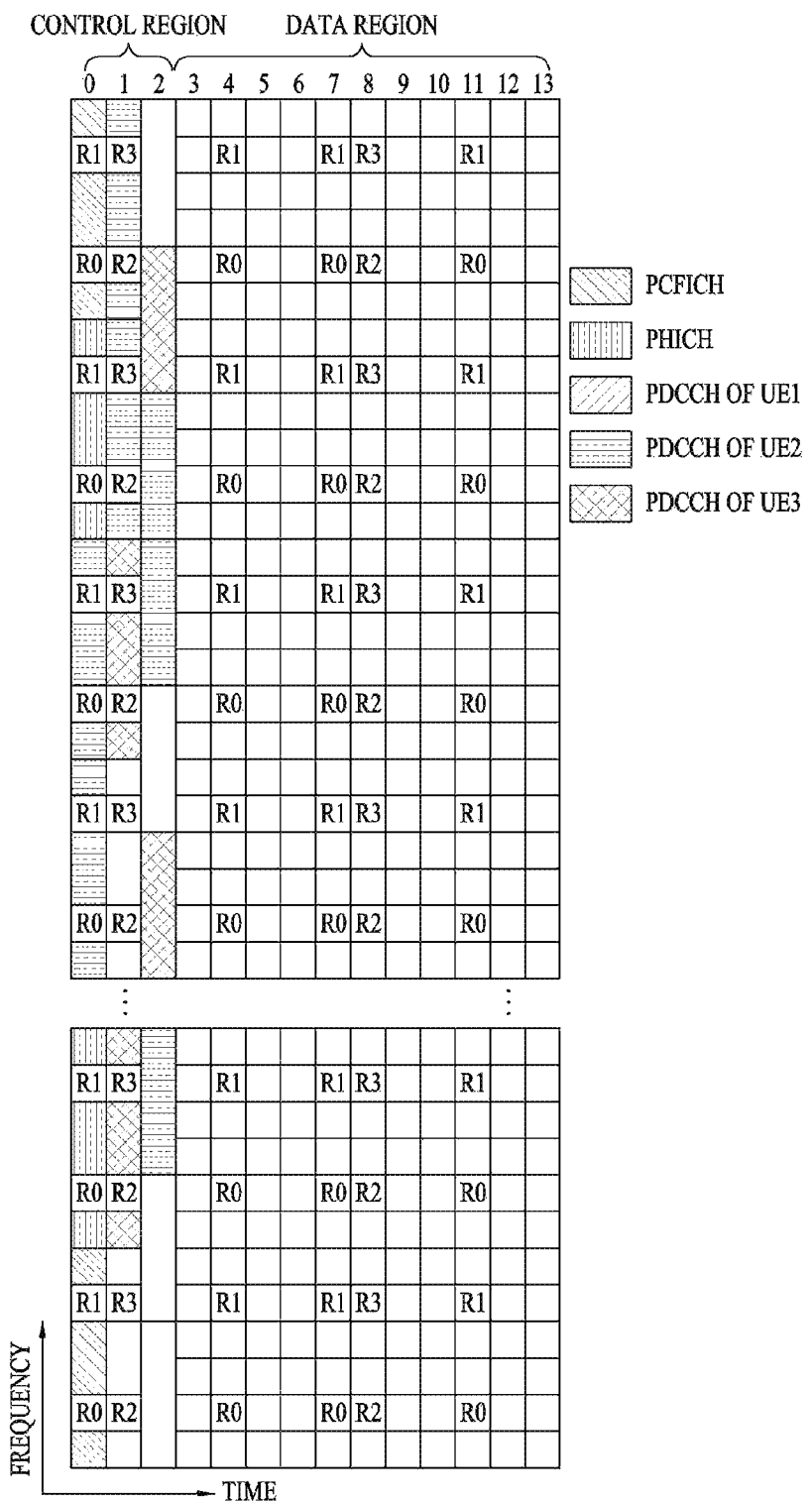
FIG. 5 is a diagram for a structure of a downlink radio frame in LTE system.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS) or a pilot signal for an antenna 0 to 3. The RS is fixed as a constant pattern in the subframe irrespective of the control region and the data region. The control channel is assigned to a resource to which the RS is not assigned in the control region and a traffic channel is also assigned to a resource to which the RS is not assigned in the data region. The control channel assigned to the control region may include a physical control format indicator channel (PCFICH), a physical hybrid-ARQ indicator channel (PHICH), a physical downlink control channel (PDCCH), and the like.

The PCFICH (physical control format indicator channel) informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH (physical HARQ (hybrid-automatic repeat and request) indicator channel) is used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH (physical DL control channel) is assigned to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on a user equipment (one or a plurality of user equipments) receiving data of PDSCH, a method of receiving and decoding the PDSCH data performed by the user equipment, and the like is transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transport block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

Figure 6:
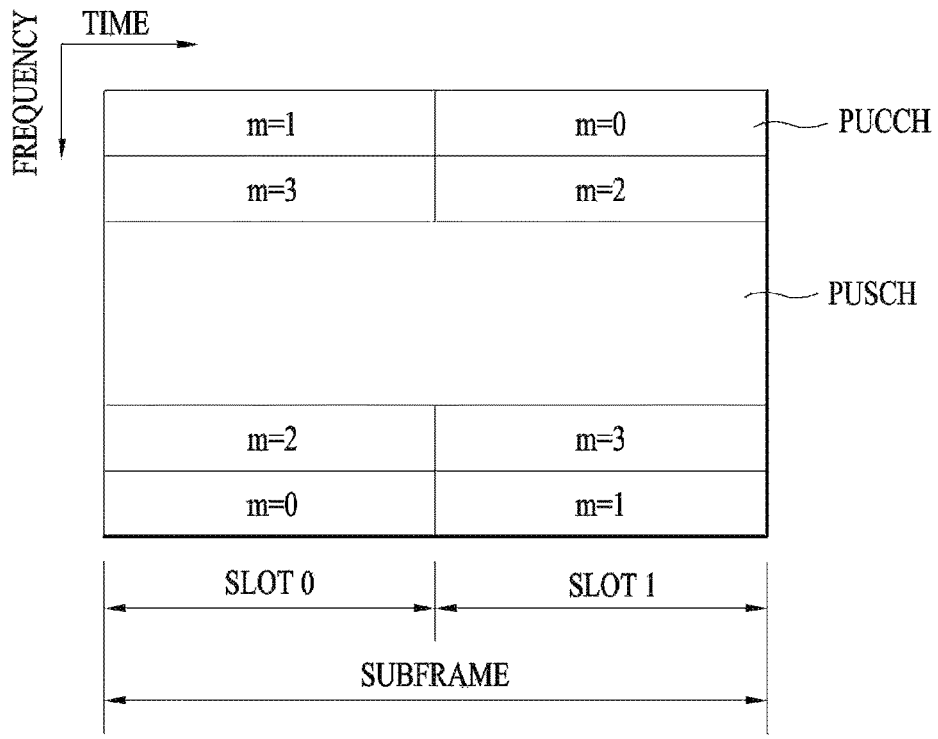
FIG. 6 is a diagram for a structure of an uplink subframe in LTE system.

FIG. 6 is a diagram for a structure of an uplink subframe used in LTE system.

Referring to FIG. 6, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource allocation request, and the like. The PUCCH for a single UE uses one resource block, which occupies a frequency different from each other in each slot within a subframe. In particular, 2 resource blocks assigned to the PUCCH are frequency hopped on a slot boundary. In particular, FIG. 6 shows an example that the PUCCHs satisfying conditions (e.g., m=0, 1, 2, 3) are assigned to a subframe.

Figure 7:
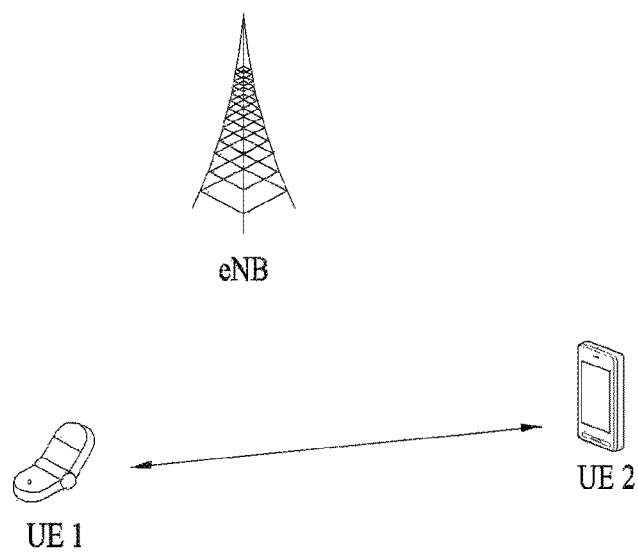
FIG. 7 is a conceptual diagram for device-to-device direct communication.

FIG. 7 is a conceptual diagram for device-to-device direct communication.

Referring to FIG. 7, in a D2D (device-to-device) communication that a UE performs direct wireless communication with a different UE, an eNB can transmit a scheduling message for indicating D2D transmission and reception in the device-to-device direct communication. A UE participating in the D2D communication receives a D2D scheduling message from the eNB and performs a transmission and reception operation indicated by the D2D scheduling message. In this case, although the UE indicates a terminal of a user, if such a network entity as an eNB transmits or receives a signal according to a communication scheme between UEs, the network entity can be regarded as a sort of UEs. In the following, a link directly linked between UEs and a link for communicating between a UE and an eNB are referred to as a D2D link and an NU link, respectively.

In order to perform a D2D operation, a UE preferentially performs a discovery procedure to identify whether a counterpart UE with which D2D communication is to be performed is located at a near region where the D2D communication is available. The discovery procedure is performed in a manner that a UE transmits a unique discovery signal capable of recognizing the UE and a neighbor UE detects the discovery signal and identifies that the UE, which has transmitted the discovery signal, is located at a near position. In particular, each UE checks that a counterpart UE with which D2D communication is to be performed is located at a near position via the discovery procedure and performs D2D communication for transmitting and receiving practical user data with the counterpart UE.

Meanwhile, a case that a UE1 selects a resource unit corresponding to a specific resource from a resource pool corresponding to a set of resources and transmits a D2D signal using the selected resource unit is explained in the following. In this case, if the UE1 is located within coverage of an eNB, the eNB can inform the UE1 of the resource pool. If the UE1 is located at the outside of the coverage of the eNB, a different UE may inform the UE1 of the resource pool or the resource pool can be determined by predetermined resources. In general, the resource pool includes a plurality of resource units. Each UE selects one or more resource units and may be then able to use the selected resource unit(s) to transmit a D2D signal of the UE.

Figure 8:
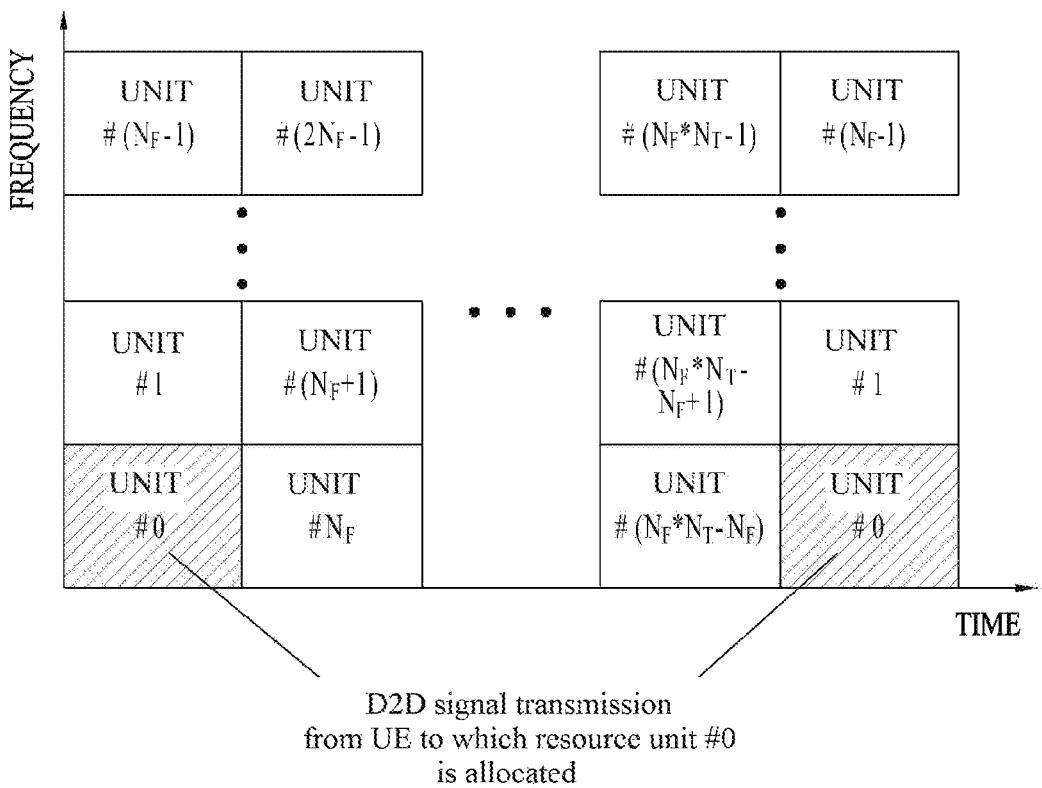
FIG. 8 is a diagram for configuration examples of a resource pool and a resource unit.

FIG. 8 is a diagram for configuration examples of a resource pool and a resource unit.

Referring to FIG. 8, it exemplary shows a case of defining $N_F * N_T$ number of resource units in total by dividing total frequency resources into $N_F$ and dividing total time resources into $N_T$. In particular, it shows that a corresponding resource pool is repeated with an interval of $N_T$ subframes. Particularly, one resource unit may periodically and repeatedly appear. Or, an index of a physical resource unit to which one logical resource unit is mapped may change in a predetermined pattern to obtain a diversity effect in time domain or frequency domain. In this resource unit structure, the resource pool may correspond to a set of resource units capable of being used for a UE to transmit a D2D signal.

The resource pool can be classified into various types. First of all, the resource pool can be classified according to contents of a D2D signal transmitted from the resource pool. For example, as shown in 1) to 3) in the following, the contents of the D2D signal can be classified into SA, a D2D data channel, and a discovery signal and a separate resource pool can be configured according to each of the contents.

1) Scheduling assignment (SA): SA may correspond to a signal including information on a resource position of a D2D data channel, information on MCS (modulation and coding scheme) necessary for demodulating a data channel, information on a MIMO transmission scheme, and the like. The SA information can be transmitted on an identical resource unit in a manner of being multiplexed with D2D data. In this case, an SA resource pool may correspond to a pool of resources in which SA and D2D data are transmitted in a manner of being multiplexed.

2) D2D data channel: A D2D data channel corresponds to a channel used by a transmission UE to transmit user data. If SA and a D2D data are transmitted on an identical resource unit in a manner of being multiplexed, a resource element (RE), which is used to transmit SA information in a specific resource unit of an SA resource pool, can also be used for transmitting D2D data in a D2D data channel resource pool.

3) Discovery signal: A discovery signal corresponds to a resource pool for transmitting a signal that enables a neighboring UE to discover a transmission UE transmitting information such as ID of the UE, and the like.

4) Synchronization signal/channel: A synchronization signal/channel corresponds to a resource pool used for a transmission UE to transmit a synchronization signal/channel and information related to synchronization.

The D2D signal can also be transmitted through an unlicensed band. The unlicensed band corresponds to a frequency band on which transmission of a signal transmitted by a random communication device satisfying a prescribed condition is permitted rather than a frequency band exclusively permitted to a specific service provider. Since it is very difficult to coordinate communication devices transmitting a signal for a different purpose on the unlicensed band, transmission of a signal exclusively transmitted by a single device for a long time is prohibited on the unlicensed band.

And, it may be able to perform CS (carrier sensing) before a signal is transmitted to detect signal transmission transmitted by a different device. For example, if reception power of a carrier is equal to or greater than a certain level, it may be able to regulate transmission not to be performed. The CS, which is performed before a signal is transmitted, is referred to as LBT (listen-before-talk). If transmission of a different signal is detected as a result of the CS, it is represented as a carrier is busy. Otherwise, it is represented as a carrier is idle.

When a D2D signal is transmitted on an unlicensed band, it is also necessary for a UE to perform LBT to transmit the signal in a situation that a carrier is idle only. However, as mentioned in the foregoing description, it may be able to regulate a D2D signal to be transmitted within a prescribed resource pool only. In particular, if a UE attempts to receive a D2D signal at the timing at which a resource pool is configured only and the UE does not attempt to receive a signal at the timing at which a resource pool is not configured, it may be able to minimize power consumption. Hence, the regulation may correspond to an important regulation in terms of power consumption of a UE receiving a D2D signal.

In the following, a method of efficiently transmitting a D2D signal based on LBT while a structure of the aforementioned resource pool is maintained is explained.

First of all, if a UE probabilistically transmits a D2D signal in a resource pool, it may be able to consistently maintain an overall interference level applied to the resource pool. In this case, it is preferable to control a transmission probability of the D2D signal according to a CS result. In particular, if a carrier is busy in a part of the resource pool due to transmission of a different signal and it is unable to use the part for D2D transmission, it indicates that a size of an available resource pool is reduced. Hence, if UEs maintain the same D2D transmission probability, an interference level per unit D2D resource or a D2D resource collision probability increases.

In particular, if it is examined that a carrier is busy in partial time of a resource pool via an LBT procedure, it is preferable to lower a D2D signal transmission probability in the resource pool to maintain interference per unit resource with a certain level.

Figure 9:
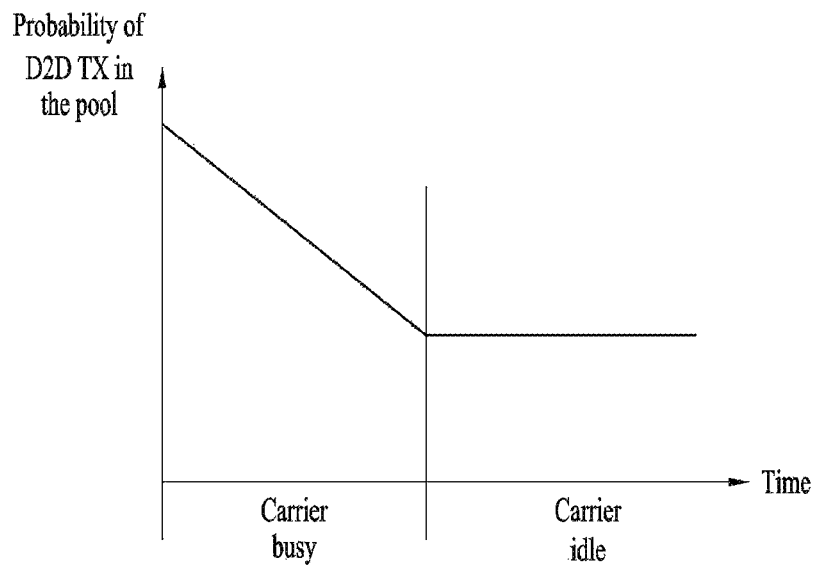
FIG. 9 is a diagram for an example of controlling a transmission probability of a D2D signal according to a CS result in accordance with embodiment of the present invention.

FIG. 9 is a diagram for an example of controlling a transmission probability of a D2D signal according to a CS result in accordance with embodiment of the present invention.

Referring to FIG. 9, if a carrier is busy from the timing at which a resource pool starts, a transmission probability is lowered. If the carrier is idle, the transmission probability is maintained. In this case, if the carrier is idle, it may indicate that the carrier is idle on the total bandwidth of the carrier or is idle in frequency domain corresponding to a resource pool among the total bandwidth of the carrier. Of course, although the transmission probability is changed in the resource pool, the transmission probability can be initialized at the timing at which a next resource pool starts.

A specific method for applying the transmission probability determined through the procedure mentioned earlier in FIG. 9 is described in A) or B) in the following.

A) If a D2D signal occurs at specific timing, the number of transmissions of the D2D signal to be transmitted in a resource pool is probabilistically determined at the timing at which the D2D signal occurs (if the D2D signal occurs before the resource pool starts in timely manner, start timing of the resource pool). In this case, the number of transmission attempts may correspond to a fixed value rather than a value probabilistically determined.

If N number of transmissions is determined, N number of resource units existing after the determined timing are selected from a resource pool region. In this case, it may be preferable to select resource units of different timing rather than two or more resource units of the same timing.

Subsequently, if a corresponding carrier is idle in each of the selected resource units, actual transmission is performed. In this case, when the carrier is idle, as mentioned in the foregoing description, although it may indicate that the carrier is idle in the total bandwidth of the carrier or is idle in frequency domain corresponding to a resource pool among the total bandwidth of the carrier, it may also indicate that the carrier is idle in frequency domain of a selected resource unit.

The N number of resource units in which a UE attempts to perform transmission (in which the UE attempts to transmit a D2D signal) in a resource pool can be determined within a prescribed range. For example, an upper limit and a lower limit of the N number of resource units can be determined by a network in advance. Specifically, when the upper limit and the lower limit are determined by M and 0, respectively, if a transmission probability in the resource pool corresponds to p, a probability of N=n can be provided by $$\frac{M!}{n!(M-n)!}p^n(1-p)^{M-n}$$

according to binominal distribution. Of course, although it is determined to transmit a D2D signal, if LBT is performed at the timing at which the signal is transmitted and a carrier is busy at the timing, transmission is not performed.

B) If a D2D signal occurs at specific timing, whether to transmit the D2D signal is determined by a probability p at every time unit from the specific timing. If it is determined to transmit the D2D signal, a counter is increased by 1. If the counter arrives at a prescribed upper limit, signal transmission is not attempted anymore in a corresponding resource pool. Of course, although it is determined to transmit a D2D signal in a specific time unit, it is necessary to perform LBT in each time unit. As a result, if a carrier is busy and transmission is not performed, it may be able to regulate the counter not to be increased.

As mentioned in the foregoing description, in case of both the method A) and the method B), although it is probabilistically determined to transmit a D2D signal at specific timing, if a carrier is busy at the specific timing, it is unable to transmit the D2D signal. In this case, it may permit a UE to reattempt to transmit the D2D signal at following timing. In this case, a transmission probability in use can be configured to be lower than a probability previously used for determining whether to perform transmission. For example, a reattempt probability can be determined by multiplying the probability previously used for determining whether to perform transmission by a value less than 1. Of course, if it is necessary to make the reattempt itself to be banned, the reattempt probability can be configured by 0.

In the aforementioned operation, a signal of a different UE using a corresponding resource pool can be distinguished from a signal which is transmitted irrespective of the use of the resource pool. Specifically, a signal of a different UE using a resource pool can be excluded in performing LBT. For example, it may be able to configure a UE not to use a partial resource (e.g., the last symbol) of each resource unit in transmitting a D2D signal and it may be able to configure a different UE intending to use the corresponding resource pool to perform CS using the partial resource (i.e., the last symbol) in the resource pool. As a different example, a UE intending to use a resource pool can determine whether or not a carrier is busy using the remaining power resulted from excluding power of a D2D signal used in a resource pool (more specifically, power of a D2D signal measured from a DM-RS) from the total measured power.

The aforementioned resource pool can be semi-statically configured. However, the resource pool can be dynamically configured for higher utilization. The aforementioned operation can be applied to the dynamically configured resource pool as well. In particular, the operation can be applied to a situation that a reception device corresponds to an eNB, the eNB sets a resource pool to a series of UEs, and a UE selects a resource from the resource pool and transmits data using the resource. In this case, since a power consumption problem of the reception device does not exist, the dynamic resource pool configuration can be more useful.

Figure 10:
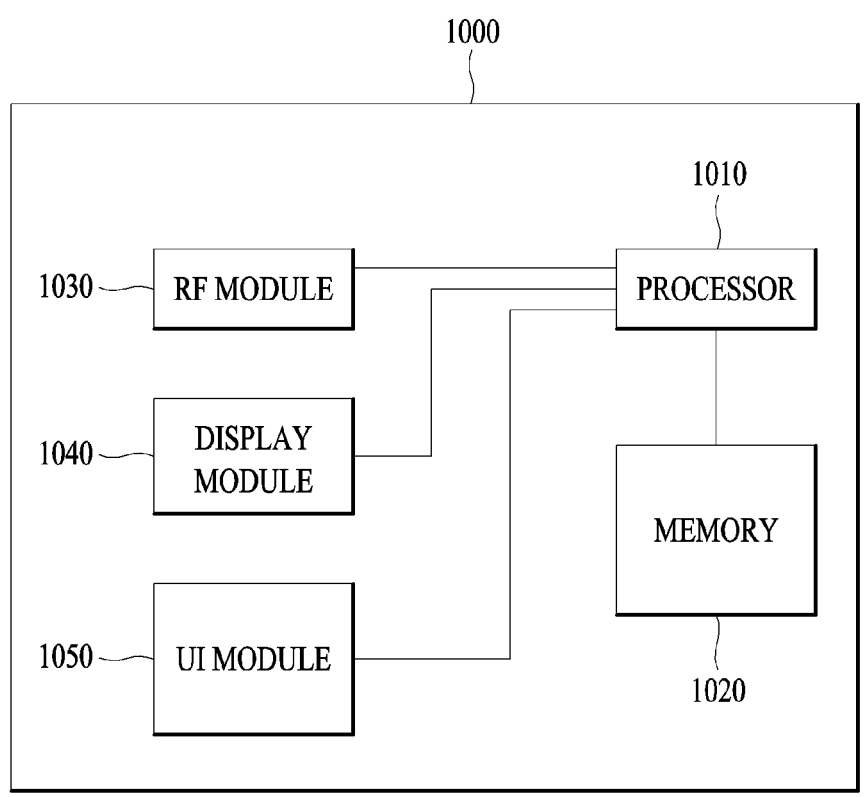
FIG. 10 is a block diagram for an example of a communication device according to one embodiment of the present invention.

FIG. 10 is a block diagram for an example of a communication device according to one embodiment of the present invention.

Referring to FIG. 10, a communication device 1000 may include a processor 1010, a memory 1020, an RF module 1030, a display module 1040, and a user interface module 1050.

Since the communication device 1000 is depicted for clarity of description, prescribed module(s) may be omitted in part. The communication device 1000 may further include necessary module(s). And, a prescribed module of the communication device 1000 may be divided into subdivided modules. A processor 1010 is configured to perform an operation according to the embodiments of the present invention illustrated with reference to drawings. In particular, the detailed operation of the processor 1010 may refer to the former contents described with reference to FIG. 1 to FIG. 9.

The memory 1020 is connected with the processor 1010 and stores an operating system, applications, program codes, data, and the like. The RF module 1030 is connected with the processor 1010 and then performs a function of converting a baseband signal to a radio signal or a function of converting a radio signal to a baseband signal. To this end, the RF module 1030 performs an analog conversion, amplification, a filtering, and a frequency up conversion, or performs processes inverse to the former processes. The display module 1040 is connected with the processor 1010 and displays various kinds of informations. And, the display module 1040 can be implemented using such a well-known component as an LCD (liquid crystal display), an LED (light emitting diode), an OLED (organic light emitting diode) display and the like, by which the present invention may be non-limited. The user interface module 1050 is connected with the processor 1010 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of transmitting a device to device direct communication signal trough an unlicensed band in a wireless communication system and an apparatus therefor are described with reference to examples applied to 3GPP LTE system, it may be applicable to various kinds of wireless communication systems as well as the 3GPP LTE system.

What is claimed is:

1. A method of transmitting a D2D (device to device) signal by a user equipment (UE) in a wireless communication system, the method comprising:
configuring a resource pool containing a plurality of resource units for transmitting the D2D signal;
determining the number of transmission attempts of the D2D signal;
selecting a number of resource units equal to the number of transmission attempts from among the plurality of the resource units; and
determining whether the selected resource units are in a busy state or an idle state; and
when the UE determines that the selected resource units are in the idle state, transmitting the D2D signal to a target UE.

2. The method of claim 1, wherein selecting a number of resource units comprises selecting a number of resource units equal to the number of transmission attempts from among the plurality of resource units existing after the timing at which the number of transmission attempts is determined.

3. The method of claim 1, wherein the resource pool is defined in an unlicensed band.

4. The method of claim 1, wherein when the UE determines that a first resource unit among the selected resource units is in the busy state, transmitting the D2D signal to the target UE comprises determining whether or not a second resource unit among the selected resource units is in the busy state or the idle state.

5. The method of claim 4, wherein when the UE determines that the second resource unit is in the idle state, transmitting the D2D signal to the target UE comprises transmitting the D2D signal to the target UE in the second resource unit.

6. The method of claim 1, wherein the selected resource units are defined by a different time resource.

7. A user equipment (UE) performing D2D (device-to-device) communication in a wireless communication system, the UE comprising:
transceiver; and
a processor, operatively coupled to the transceiver,
wherein the processor is configured to:
determine the number of transmission attempts of a D2D signal;
select a number of resource units equal to a number of transmission attempts from among a plurality of resource units belonging to a resource pool configured to transmit the D2D signal;
determine whether the selected resource units are in a busy state or an idle state; and
control the transceiver to transmit the D2D signal to a target UE, when the processor determines that the selected resource units are in the idle state.

8. The UE of claim 7, wherein the processor is further configured to:
select a number of resource units, which exist after the timing at which the number of transmission attempts is determined, from the resource pool.

9. The UE of claim 7, wherein the resource pool is defined in an unlicensed band.

10. The UE of claim 7, wherein when the processor determines that a first resource unit among the selected resource units is in the busy state, the processor is further configured to determine whether or not a second resource unit among the selected resource units is in the busy state or the idle state.

11. The UE of claim 10, wherein when the processor determines that the second resource unit is in the idle state, the processor is further configured to control the transceiver to transmit the D2D signal to the target UE in the second resource unit.

12. The UE of claim 7, wherein the selected resource units are defined by a different time resource.

* * * * *